US 6,556,551 B1

(12) United States Patent
Schwartz

(10) Patent No.: US 6,556,551 B1
(45) Date of Patent: Apr. 29, 2003

(54) MULTI-FREQUENCY PILOT BEACON FOR CDMA SYSTEMS

(75) Inventor: Adam L. Schwartz, Berkeley, CA (US)

(73) Assignee: LGC Wireless, Inc., San Jose, CA (US)

( * ) Notice: Subject to any disclaimer, the term of this patent is extended or adjusted under 35 U.S.C. 154(b) by 0 days.

(21) Appl. No.: 09/321,312

(22) Filed: May 27, 1999

(51) Int. Cl.$^7$ ................................................ H04Q 7/00
(52) U.S. Cl. ...................... 370/331; 370/335; 370/320; 370/342
(58) Field of Search ................................ 370/320, 328, 370/331, 332, 333, 334, 335, 330, 342, 479; 455/436, 453, 450, 522, 442, 437

(56) References Cited

U.S. PATENT DOCUMENTS

| | | | |
|---|---|---|---|
| 5,101,501 A | 3/1992 | Gilhousen et al. | 455/33 |
| 5,267,261 A | 11/1993 | Blakeney, II et al. | 375/1 |
| 5,828,661 A | 10/1998 | Weaver, Jr. et al. | 370/331 |
| 5,848,063 A | 12/1998 | Weaver, Jr. et al. | 370/331 |
| 6,078,571 A * | 6/2000 | Hall | 370/331 |
| 6,188,906 B1 * | 2/2001 | Lim et al. | 455/453 |
| 6,201,802 B1 * | 3/2001 | Dean | 370/350 |
| 6,216,004 B1 * | 4/2001 | Tiedemann, Jr. et al. | 455/442 |

* cited by examiner

Primary Examiner—Vivian Chin
Assistant Examiner—John J Lee
(74) Attorney, Agent, or Firm—Lumen Intellectual Property Services, Inc.

(57) ABSTRACT

A multi-frequency pilot beacon adapted to a CDMA system using at least two different carrier frequencies, F1 and F2, for supplying PN sequences at these frequencies. The pilot beacon has a pseudorandom noise generator for supplying a pseudorandom noise sequence PN and a frequency conversion mechanism for converting the PN sequence to a first pilot beacon centered at the first CDMA carrier F1 and a second pilot beacon centered at the second CDMA carrier F2. The multi-frequency pilot beacon can be provided at a base station of a given cell to transmit the pilot beacons within that cell and the base station antenna can be used for transmitting the pilot beacons in this embodiment. Alternatively, multi-frequency pilot beacons can be provided wherever necessary within the CDMA system. The multi-frequency pilot beacon is useful in frequency hand-off operations and gathering information about cellular users in the CDMA system

21 Claims, 5 Drawing Sheets

MULTI-FREQUENCY PILOT BEACON FOR CDMA SYSTEMS

FIELD OF THE INVENTION

This invention relates generally to cellular wireless telephone systems and, in particular, to multi-frequency pilot beacons for hand-off of transceivers operating in Code Division Multiple Access (CDMA) systems.

BACKGROUND OF THE INVENTION

A cellular communication system is one in which coverage is provided in relatively small areas, commonly referred to as cells, that overlap. These overlapping cells form a grid of radio coverage that extends over a region of interest, e.g., an urban area.

In traditional cellular systems each call or radio connection between a mobile transceiver (telephone) and a cellular base station occupies a narrow segment of the frequency spectrum allocated to the provider of the cellular service. Since each call must have its own frequency segment the total number of simultaneous calls which can be handled is limited by the number of segments in the frequency spectrum.

When the coverage area is broken up into cells, frequency segments or frequencies can be reused in cells that are far enough apart so that the signals at the same frequency do not interfere with one another. In a typical cellular system the frequency reuse factor (how many cells have to be operating on different frequencies before frequency reuse can occur) is 7. At this reuse factor cells reusing the same frequency are two cells away from each other. This also means, that only a seventh of the allocated frequency spectrum can be used within any given cell.

While moving within the cellular grid a mobile transceiver is forced to switch its operating frequency between the channels allocated to the different cells. This process is called "hand-off". In practice, the base station in one cell hands-off the transceiver call to a base station in another cell by forcing the transceiver to switch frequencies.

There are numerous problems with this traditional approach, often resulting in dropped calls and inefficient use of the frequency spectrum. Code Division Multiple Access (CDMA) technology is one of several alternative techniques for supporting cellular wireless communications in such a cellular system. CDMA systems have significant advantages over competing systems for multiple access communications such as Time Division Multiple Access (TDMA), Frequency Division Multiple Access (FDMA) and AM modulated systems such as Amplitude Companded Single Sideband (ACSSB) systems. Specifically, CDMA techniques result in a higher spectral efficiency than can be achieved using other multiple access techniques. In other words, more calls can be made in a given frequency band using CDMA than using other technologies.

In a prior art CDMA network 10 only one frequency band or carrier frequency, F1 is used by all cells 12, as shown in FIG. 1. A base station control 18, which operates base stations 20 in cells 12 does not issue frequency hand-off commands. That is because a transceiver 14 of a mobile user 16 does not have to hand-off between different frequencies in network 10.

Typically, a CDMA signal 22 in network 10 occupies a 1.25 MHz band (although other implementations can use more or less bandwidth). The band is centered at carrier frequency F1 and several CDMA signals are superimposed upon each other within the band. As shown in FIG. 2, each CDMA signal 22 is created by multiplying a narrow band (about 10 kHz wide) baseband signal 24 containing the data (e.g., voice data) by a spreading code which increases the resulting bandwidth to 1.25 MHz. On the forward link, from base station 20 to transceiver 14, CDMA signal 22 is prepared by spreading baseband signal 24 twice; once by a Walsh code and once by a pseudorandom noise sequence PN.

Baseband signal 24 is multiplied in a mixer 28 with a Walsh code $W_i$ provided from a Walsh code generator 26 to produce a coded signal 30. Since individual Walsh codes are orthogonal their inner product satisfies the following condition:

$$W_i * W_j = \begin{cases} 0 & i \neq j \\ N & i = j \end{cases}$$

Thus, baseband signal 24 multiplied by Walsh code $W_i$ on the forward link can only be demodulated by a receiver by multiplying it with the same Walsh code, i.e., $W_i$. Multiplication with any other Walsh code will not yield a signal. Hence, the receiver set to use Walsh code $W_i$ will reject all signals which are prepared with any Walsh code other than $W_i$.

Walsh coded signal 30 is then multiplied with the aid of mixers 32, 34 by a short pseudorandom noise sequence PN provided by a PN generator 36. The PN sequence has a characteristic offset. In this case coded signal 30 is multiplied by an in-phase and a quadrature portion of the PN sequence in accordance with standard modulation techniques. The multiplied signals are converted from digital to analog and filtered by circuits 25, 27 and then combined by a combining circuit 38. The thus created CDMA signal 22 is up-converted by a mixer 23 to carrier frequency F1 and sent to antenna 40 for transmission.

Since the same carrier frequency F1 is used throughout CDMA network 10 base stations 20 are assigned unique offsets of the PN sequence to distinguish them. For example, base station 20A uses sequence $PN_A$ which is the PN sequence with an offset A in generating its CDMA signals, base station 20B uses sequence $PN_B$, and so on. The various sequences $PN_A$, $PN_B$, ... etc. are generated by shifting the standard PN sequence by varying offset amounts also referred to as PN offsets. The PN sequences are used to multiply each channel including a pilot channel. The pilot channel is defined as the unmodulated Walsh code zero. In other words, the pilot channel requires that generator 26 be set to zero and baseband signal 24 be zero. As a result, only the PN sequence with its given PN offset is transmitted in the pilot channel.

Just as in the case of frequency reuse, PN sequences with the same offsets can be reused in cells 12 which are sufficiently far apart to avoid interference, e.g., cells 12A and 12B use the same sequence $PN_A$. Transceiver 14 will examine the different PN offsets to thus identify base stations 20 near it. As user 16 moves from one cell 12 to another, transceiver 14 can hand off to a neighboring base station in a soft hand-off process. The carrier frequency remains the same but the PN sequence of the new base station is used. The process is called soft because during the transition from one base station to another transceiver 14 is communicating simultaneously with both base stations.

As the number of mobile telephone users increases, more capacity than offered by CDMA network 10 will be required.

One way to accomplish this goal is to use more frequency channels within the allocated frequency spectrum by adapting CDMA network 10 to operate at more than one carrier frequency. This means that CDMA network 10 will have to accommodate hard or frequency hand-off between different frequencies used in different cells 12.

The prior art teaches the use of a pilot channel assigned Walsh code zero (0) to carry the PN offset information. The signal corresponding to the PN offset information is referred to as the pilot beacon. Knowledge of the PN offset allows the transceiver to identify with which base station they are communicating.

In U.S. Pat. No. 5,848,063 Weaver, Jr. et al. discusses the use of a pilot beacon for handing-off between dissimilar CDMA networks. The hand-off is not necessarily a frequency hand-off (hard hand-off) and the teaching is directed primarily at the hand-off algorithm and uses the measured time delay for the pilot beacon between the base station and the transceiver as a parameter for deciding when to execute a hand-off. U.S. Pat. No. 5,697,055 to Gilhousen et al. also discusses algorithms for determining hand-off between different cellular systems.

In U.S. Pat. No. 5,858,661 Weaver, Jr. et al. teach a method for creating areas where certain transceivers cannot communicate with certain base stations. These regions of silence are indicated by the presence of a pilot beacon with a specific PN offset indicating that any mobile transceiver hearing this pilot beacon is within the silence region.

In U.S. Pat. Nos. 5,267,261 and 5,101,501 Blakeney, II et al. and Gilhousen et al. teach the details of soft-hand off using pilot channels radiating pilot beacons. Each base station transmits a pilot beacon or pilot tone with a specific PN offset. All pilot beacons are transmitted at the same frequency.

In a CDMA system using various frequencies hand-off, in particular hard hand-off or frequency hand off between cells presents a new challenge. None of the prior art teaches how to produce a pilot beacon which can be used for executing such hand-offs in such CDMA networks.

OBJECTS AND ADVANTAGES OF THE INVENTION

Accordingly, it is a primary object of the present invention to provide a pilot beacon for use in a CDMA system using different carrier frequencies. Specifically, the object of the invention is to provide a multi-frequency pilot beacon for transmitting PN offset information to cellular users.

It is another object of the invention to adapt a CDMA system to use a multi-frequency pilot beacon for performing hard hand-off operations.

Yet another object of the invention is to provide a multi-frequency pilot beacon which is easy to manufacture and integrate in a CDMA system. The multi-frequency pilot beacon can be used in various configurations, including in-building micro-cells.

The above objects and advantages, as well as numerous improvements attained by the apparatus and method of the invention are pointed out below.

These objects and advantages are secured by a multi-frequency pilot beacon adapted to a CDMA system using at least two different carrier frequencies, such as a first CDMA carrier frequency F1 and a second CDMA carrier frequency F2. The pilot beacon has a pseudorandom noise generator for supplying a pseudorandom noise sequence PN. It also has a frequency conversion mechanism for converting the PN sequence to a first pilot beacon centered at the first CDMA carrier F1 and a second pilot beacon centered at the second CDMA carrier F2. A transmitting unit transmits the first and second pilot beacons to the transceiver or mobile cellular unit.

The multi-frequency pilot beacon can be provided at a base station of a given cell to transmit the pilot beacons within that cell. The base station antenna can be used for transmitting the pilot beacons in this embodiment. Alternatively, multi-frequency pilot beacons can be provided wherever necessary within the CDMA system. In this situation the pilot beacons can be transmitted directly from the pilot beacon unit.

The PN sequences (in-phase and quadrature) are preferably digital sequences. The pilot beacon is equipped with a digital-to-analog converter for converting these digital PN sequences to an analog PN sequences.

In one embodiment the pilot beacon generates the PN sequences at an intermediate frequency (IF). Additional circuit elements are provided to accommodate this alternative.

A CDMA system using the multi-frequency pilot beacon uses the pilot beacons to hand-off the cellular transceiver between carrier frequencies. The carrier frequencies can be used in the same cell or in different, e.g., adjacent cells. Preferably, a hand-off order is issued by a CDMA system controller based on the traffic volume at the carrier frequencies involved. Alternatively, the hand-off order can be based on the location of the transceiver.

There are many methods for operating the multi-frequency pilot beacon. The pilot beacons can be transmitted together from the same location or from different locations or even from the base station. The configuration of the specific CDMA network can impose additional requirements on how to use the multi-frequency pilot beacon of the invention.

The particulars of the invention and its various embodiments are described in detail in the detailed description section with reference to the attached drawing figures.

DETAILED DESCRIPTION

Figure 1:
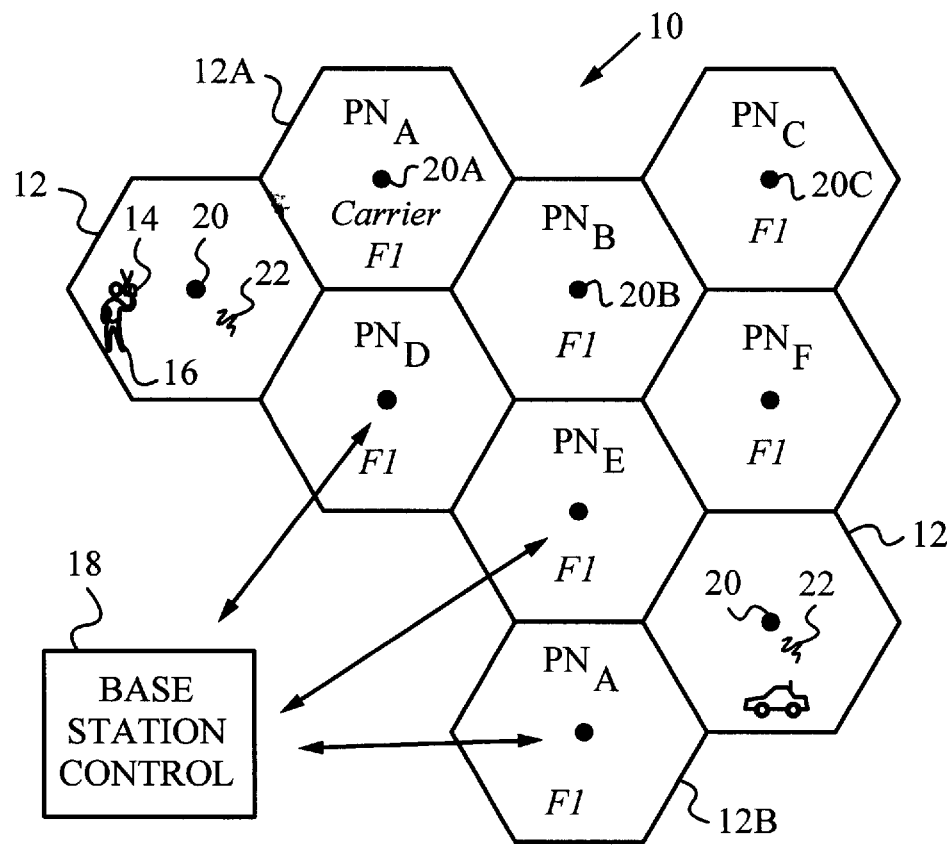
FIG. 1 is a schematic view of a prior art CDMA network.
Figure 2:
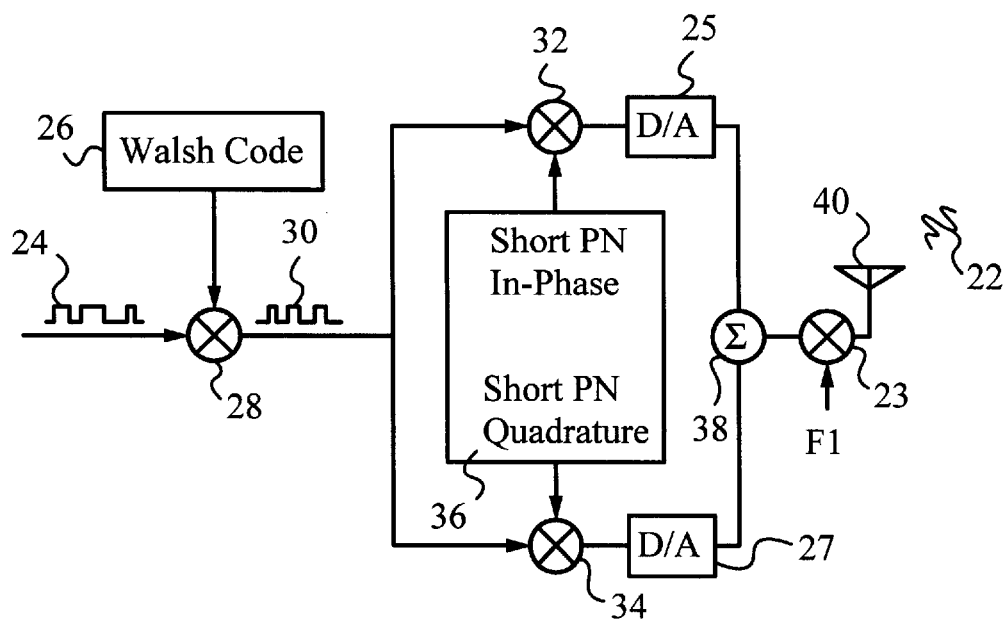
FIG. 2 is a block diagram illustrating the generation of a CDMA signal in a prior art CDMA network.
Figure 3:
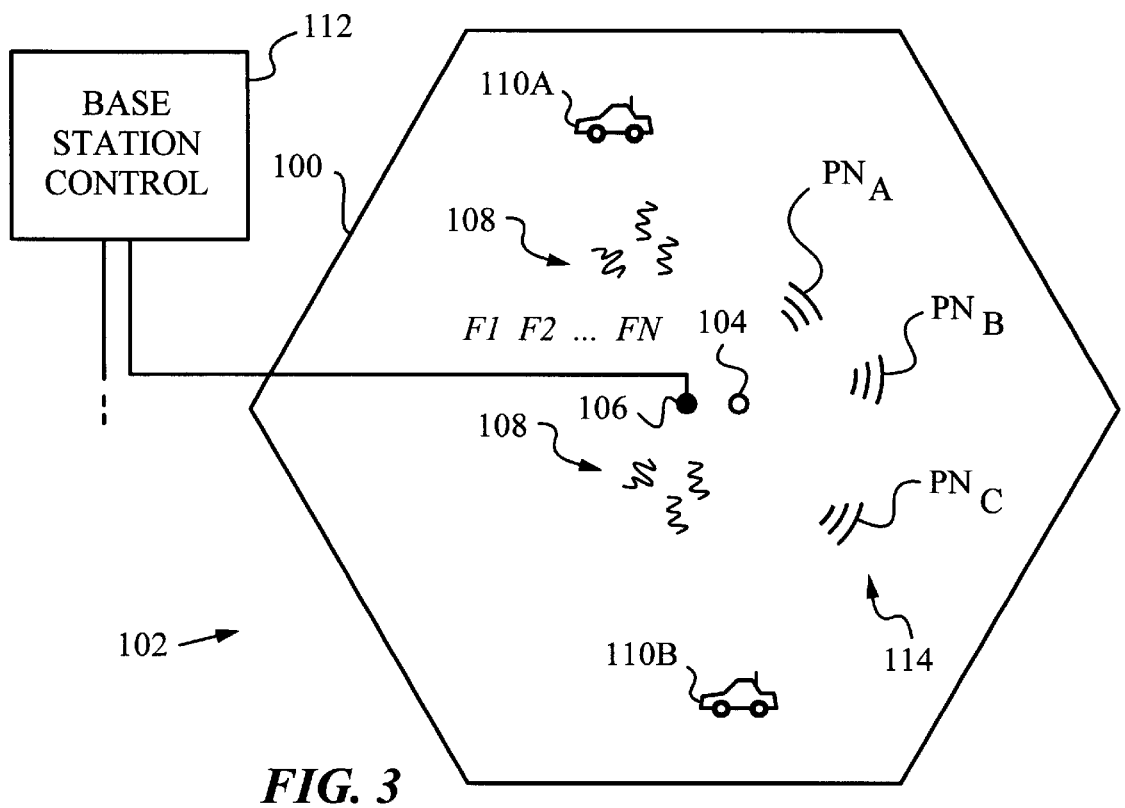
FIG. 3 is a diagram showing a cell in a CDMA network utilizing a multi-frequency pilot beacon according to the invention.
Figure 4:
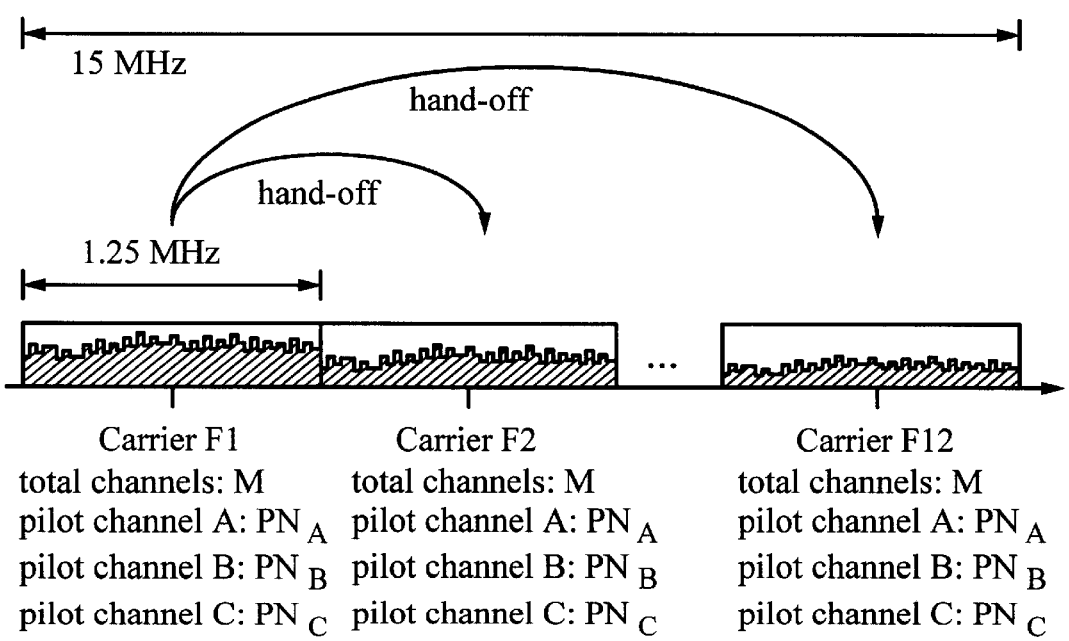
FIG. 4 is a diagram illustrating the hand-off between different carrier frequencies in a multi-frequency CDMA network.

A cell 100 belonging to a CDMA network 102 utilizing a multi-frequency pilot beacon 104 is shown in FIG. 3. A base station 106 of network 102 uses a number N of frequency bands centered at carrier frequencies F1, F2, . . . FN respectively. For example, as shown in FIG. 4, the total frequency spectrum 112 utilized by network 102 within cell 100 is 15 MHz wide and each frequency band centered around the respective carrier frequencies F1, F2, . . . FN is 1.25 MHz. This means that N=12; i.e., 12 frequency bands are available within cell 100. Of course, other frequency ranges yielding different numbers of frequency bands can be utilized as well.

CDMA communications or data signals 108 are transmitted between base station 106 and cellular users equipped with transceivers 110A, 110B. CDMA signals 108 can be transmitted at any of the carrier frequencies F1, F2, . . . F12 available in cell 100.

A base station control 112 is connected to base station 106 as well as base stations of other cells belonging to network 102. Base station control 112 is responsible for regulating the communications between all transceivers in cell 100 such as transceivers 110A, 110B and base station 106. In particular, control 112 is configured to assign transceivers 110A, 110B to handle their calls, i.e., receive and transmit signals 108, at one of the available carrier frequencies F1, F2, . . . F12. Furthermore, base station control 112 monitors the status of CDMA network 102 and cell 100 and issues frequency or hard hand-off orders to force transceivers 110A, 110B to switch the carrier frequencies they are using in communicating with base station 106 depending on the status of network 102 and cell 100. For example, transceiver 110A may be originally asked by base station control 112 to handle its call at carrier frequency F1. While the call is in progress the traffic volume at carrier frequency F1 monitored by base station control 112 increases. Thus, base station control 112 issues a hard hand-off order to transceiver 110A to switch to carrier frequency F2 and continue the call at F2. To aid base station control 112 in making frequency hand-off decisions transceivers 110A, 110B, in addition to handling calls at their assigned carrier frequencies, report their status and specifically any signals they receive to base station control 112.

As shown in FIG. 4, a number M of channels is available in each frequency band. In prior art CDMA networks each frequency band contains, in addition to the channels on which calls are handled, a synchronization channel, a paging channel and one pilot channel. The present invention, uses additional pilot offsets at each carrier frequency F1, F2, . . . FN. In particular, multi-frequency pilot beacon 104 transmits pilot beacons 114 consisting of unmodulated Walsh code zero baseband signal multiplied by standard PN sequence with three different offsets A, B and C in three corresponding pilot channels. For convenience in notation the PN sequences with these three offsets are referred to as $PN_A$, $PN_B$ and $PN_C$ and the corresponding pilot channels are designated A, B, C.

Multi-frequency pilot beacon 104 transmits pilot beacons 114 consisting of all three PN sequences $PN_A$, $PN_B$ and $PN_C$ in each frequency band. In other words, each frequency band has three pilot channels in this embodiment. All three pilot channels contain a Walsh code zero baseband signal multiplied by sequences $PN_A$, $PN_B$ or $PN_C$. In the present embodiment first sequence $PN_A$ is used in each frequency band to multiply the baseband data signal to produce CDMA signals 108. In alternative embodiments, any frequency band may use any one of sequences $PN_A$, $PN_B$ and $PN_C$ for producing CDMA signals 108.

In the present embodiment, sequences $PN_B$ and $PN_C$ in pilot channels B and C are used for frequency hand-off operations. There are many ways of implementing sequences $PN_B$ and $PN_C$ produced by multi-frequency pilot beacon 104 to be used in hand-off operations.

For example, transceiver 110A is enabled to receive pilot channel B and transceiver 110B is enabled to receive pilot channel C. When communicating with base station 106 in the frequency band at carrier frequency F1 transceiver 110A detects sequence $PN_B$ transmitted in pilot channel B in the same frequency band. In reporting its status to base station control 112, transceiver 110A informs base station control 112 that it is receiving sequence $PN_B$. Based on this information, and the high traffic volume in frequency band F1 and low traffic volume in frequency band F2 base station control 112 sends an order for transceiver 110A to hard hand-off its call to frequency band F2. After this hard hand-off transceiver 110A uses sequence $PN_A$ of pilot channel A at F2 to multiply its baseband data to produce CDMA signals 108.

Meanwhile, transceiver 110B is also communicating with base station 106 in frequency band F1 and it receives sequence $PN_C$ in pilot channel C. Transceiver 110B informs base station 106 that it is receiving sequence $PN_C$. Based on this information, and the high traffic volume in frequency band F1 and low traffic volume in frequency band F12 base station control 112 sends an order for transceiver 110B to hard hand-off its call to frequency band F12. After this hard hand-off transceiver 110B uses sequence $PN_A$ of pilot channel A at F12 to multiply its baseband data to produce CDMA signals 108.

Of course, both transceivers 110A and 110B can be enabled to detect pilot channels B and C. Alternatively, transceivers 110A, 110B can be enabled to detect pilot channels B and/or C only when operating in a particular subset of frequency bands F1, F2, . . . F12. It should also be noted that the position of multi-frequency pilot beacon 104 in cell 100 can be selected such that pilot channels B and/or C are only detected by transceivers 110A, 110B in a particular area of cell 100. In this case sequence $PN_A$ produced by multi-frequency pilot beacon 104 can be transmitted from base station 106 to ensure that it is detected transceivers 110A, 110B at any location within cell 100. Also, more than one multi-frequency pilot beacon 104 can be used in cell 100. Preferably, the choice of carrier frequency made by base station control 112 is based on the traffic volumes in the frequency bands used in cell 100. Alternatively, base station control 112 can issue the hand-off order based on the location of transceivers 110A, 110B in cell 100. For example, carrier frequency F2 may be determined to be more suitable for communication between transceiver 110A and base station 106 due to power level considerations or other parameters in addition to or independent of the traffic volume.

A person of average skill in the art will recognize that supply of sequences $PN_B$ and $PN_C$ and appropriate enablement of pilot channels B and C of transceivers 110A, 110B allows base station control 112 to obtain more information about the status of transceivers 110A, 110B. Knowledge of the received pilot offsets enables base station control 112 to make more efficient frequency hand-off decisions and/or to make frequency hand-off decisions based on the status, capabilities, location of transceivers 110A, 110B. In fact, any factors which are implicit when transceiver 110A or 110B receives pilot channel A and/or B provided by the multi-frequency pilot beacon 104 supply valuable information to base station control 112 for its decision-making process.

Figure 5:
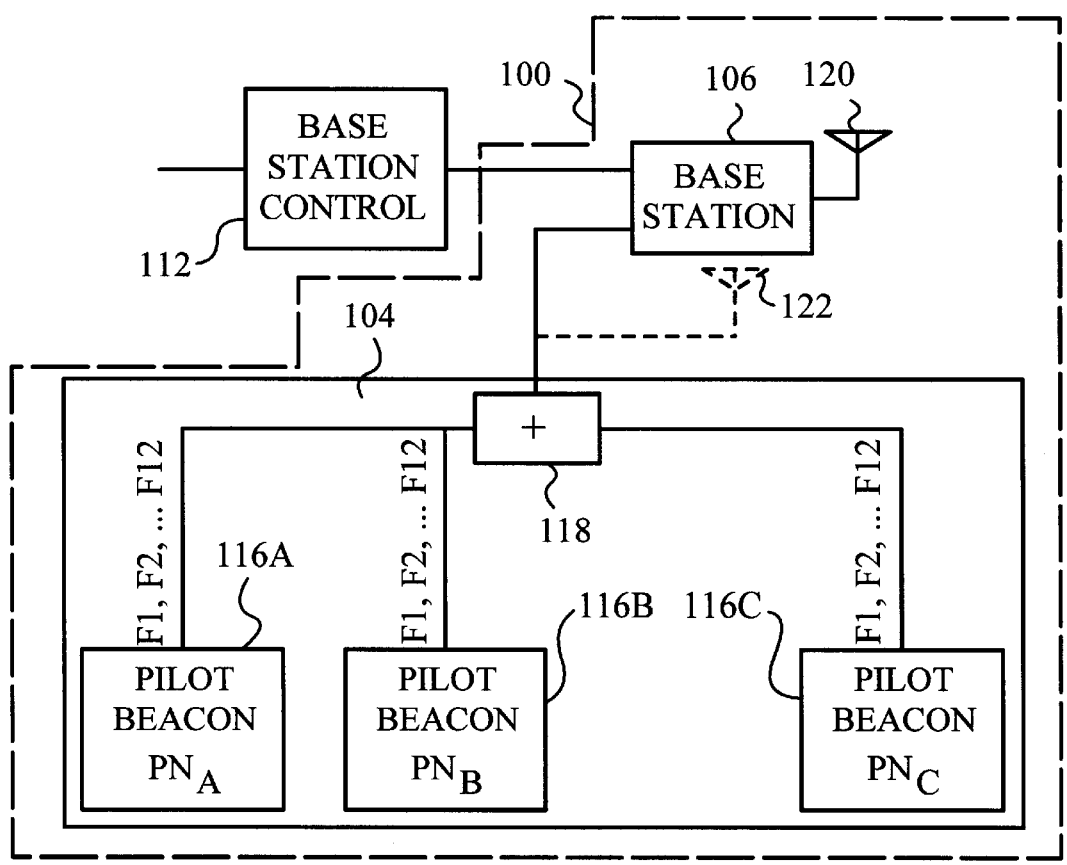
FIG. 5 is a diagram showing the details of generating pilot beacons at multiple frequencies.

In this embodiment, all pilot beacons 114 are transmitted in pilot channels A, B, C at each carrier frequency F1, F2, ... FN, as shown in FIG. 5. In other words, 3 pilot channels in each frequency band are used. To accomplish this, multi-frequency pilot beacon 104 has separate multi-frequency beacon units 116A, 116B, 116C for generating PN sequences with offsets $PN_A$, $PN_B$, $PN_C$ at all carrier frequencies F1, F2, ... F12. A processing unit 118 combines PN sequences with offsets $PN_A$, $PN_B$, $PN_C$ at all carrier frequencies F1, F2, F12 and distributes them to the corresponding three pilot channels A, B, and C at each carrier frequency. Processing unit 118 can be connected directly to base station 106 and use the same antenna 120 as base station 106 for transmitting pilot beacons 114. Alternatively, a separate antenna 122 can be connected to unit 118 for transmitting all or some of the frequency bands F1, F2, ... F12. The choice will be made by the designer of CDMA system 102 depending on how base station control 112 and transceivers 110A, 110B will utilize pilot beacons 114 for frequency hand-off.

Figure 6:
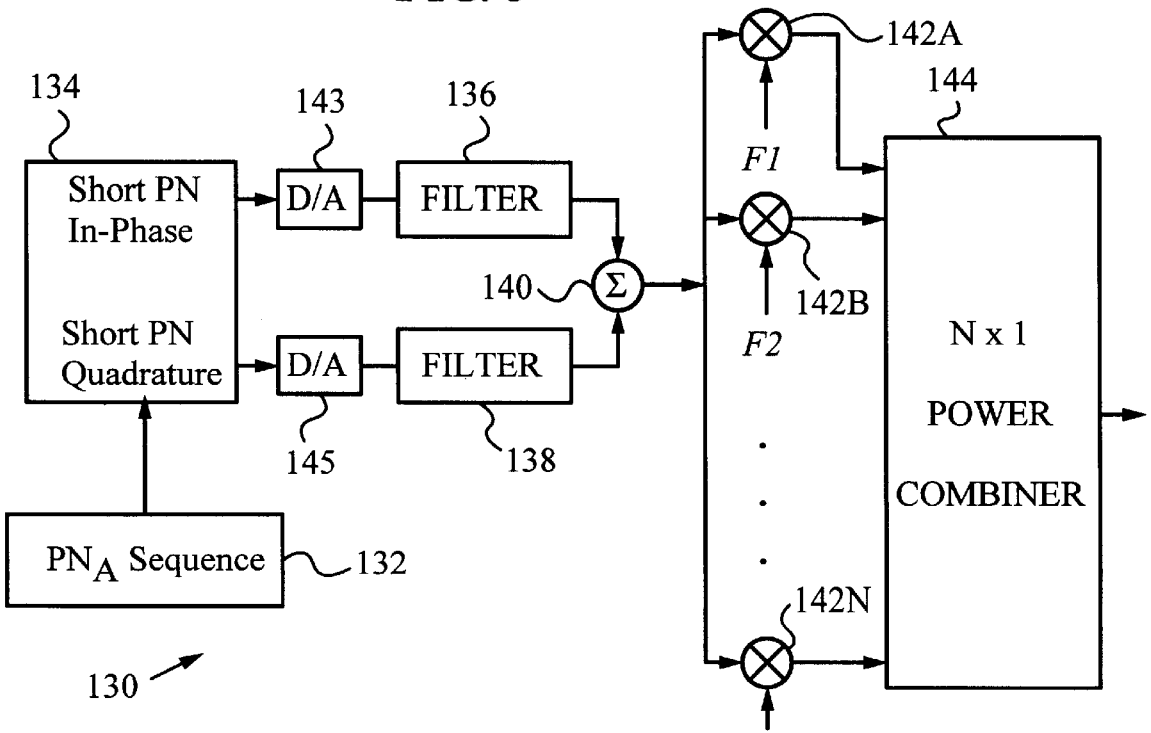
FIG. 6 is a block diagram showing a preferred multi-frequency pilot beacon according to the invention.

A preferred multi-frequency beacon unit 130 which can be employed as unit 116A is shown in FIG. 6. Unit 130 has an offset circuit 132 for supplying sequence $PN_A$. In accordance with standard modulation techniques, sequence $PN_A$ is translated into in-phase short PN and a quadrature short PN signals. The in-phase and quadrature signals are produced by unit 134 and converted from digital to analog form by digital-to-analog converters 143, 145. It should be noted that digital-to-analog conversion can take place at other locations in unit 130, as is known in the art. The converted signals are sent to low-pass filters 136, 138 respectively for low pass filtering to produce bandlimited signals. These are combined by combining circuit 140 to produce a single sequence $PN_A$.

The analog sequence $PN_A$ is sent to N mixers 142A, 142B, ... 142N. Other sequences, $PN_B$, $PN_C$ etc. can be combined with $PN_A$ before mixing. Mixers 142A, 142B, ... 142N are also supplied with carrier frequencies F1, F2, ... FN of the individual frequency bands. Carrier frequencies F1, F2, ... FN can be supplied from any suitable source, e.g., local oscillators or CDMA system oscillators (not shown). Mixers 142A, 142B, ... 142N perform a standard up-conversion of analog sequence $PN_A$ to carrier frequencies F1, F2, ... FN. A person of average skill in the art will realize that the up-conversion process need not be performed in a single up-conversion step using only mixers 142A, 142B, ... 142N.

An N×1 power combiner 144 combines sequences $PN_A$ at frequencies F1, F2, ... FN. These are then delivered, for example, to processing unit 118 shown in FIG. 5. When unit 130 is used as pilot beacon unit 116A in multi-frequency pilot beacon 104 N=12. In this embodiment the number of mixers 142 is twelve and they are supplied with twelve carrier frequencies F1, F2, ... F12.

Figure 7:
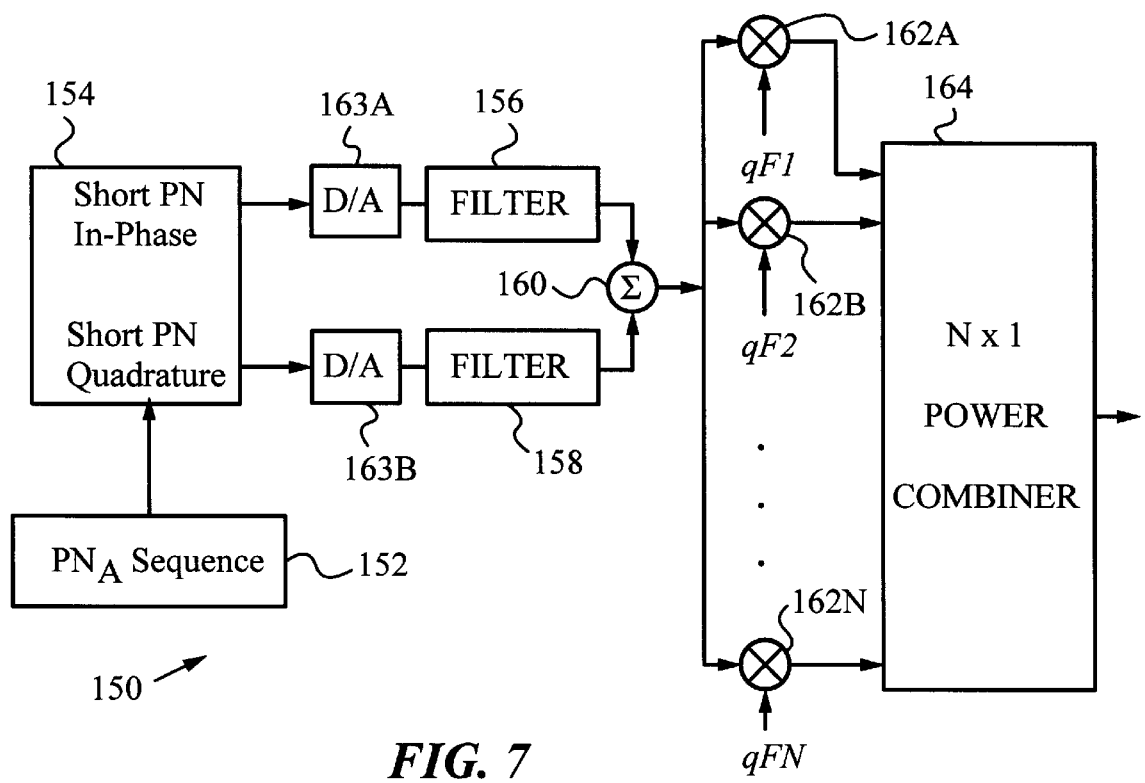
FIG. 7 is a block diagram of another multi-frequency pilot beacon according to the invention.

FIG. 7 shows an alternative embodiment of a multi-frequency pilot beacon unit 150. Unit 150 is similar to unit 130, but instead of up-converting signal from baseband, it uses an intermediate frequency (IF) (e.g., 70 MHz) sequence $PN_A$ from circuit 152. In accordance with standard modulation techniques, sequence $PN_A$ is translated into in-phase short PN and a quadrature short PN signals, both at the intermediate frequency. The in-phase and quadrature signals are produced by unit 154 and sent to digital-to-analog converters 163A and 163B which convert the in-phase and quadrature intermediate frequency signals to analog intermediate frequency signals. Low-pass or band pass filters 156, 158 filter these signals to produce bandlimited intermediate frequency signals. These filtered analog signals are combined by combining circuit 160 to produce a single intermediate frequency sequence $PN_A$.

The intermediate frequency sequence $PN_A$ is sent to N mixers 162A, 162B, ... 162N. Mixers 162A, 162B, ... 162N are also supplied with fractional carrier frequencies qF1, qF2, ... qFN for up-converting intermediate frequency sequence $PN_A$ to carrier frequencies F1, F2, ... FN. The value of q is calculated based on the relationship that qF1=F1−IF. Fractional carrier frequencies qF1, qF2, ... qFN can be derived from any suitable source, e.g., local oscillators or CDMA system oscillators (not shown), as is known in the art.

A person of average skill in the art will recognize that the above embodiment of the multi-frequency pilot beacon is adapted for use in CDMA network 102 using 12 frequency bands containing the same number of channels (M). However, the number of frequency bands N can vary as required, and not all channels may be utilized in any particular frequency band. These parameters can also vary from cell to cell. Hence, in some cells it may not be required to transmit all the pilot beacons. Thus, the multi-frequency pilot beacon should be adapted to the particular CDMA system.

Figure 8:
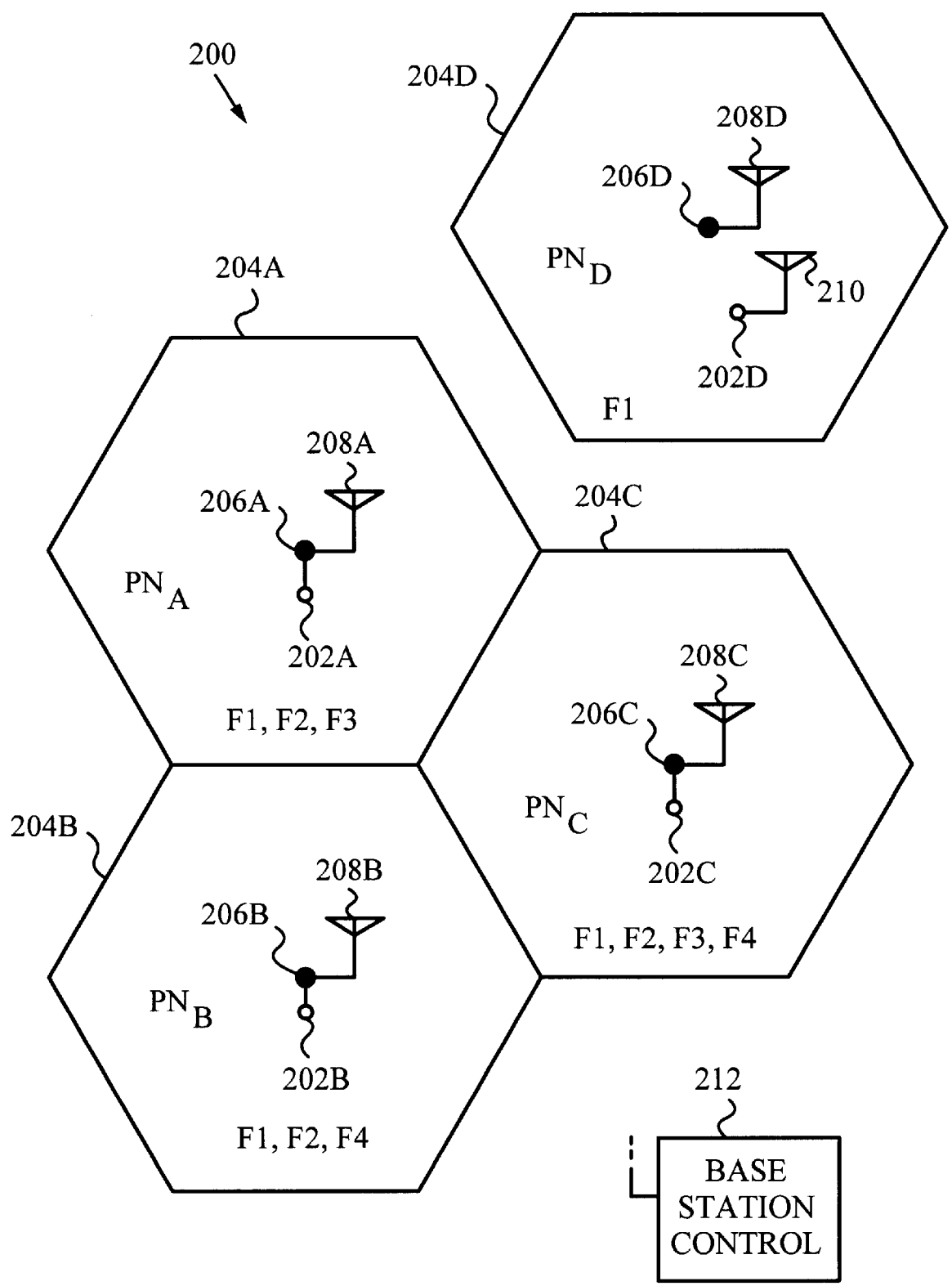
FIG. 8 is a schematic showing the deployment of multi-frequency pilot beacons in another CDMA network.

FIG. 8 illustrates four cells 204A, 204B, 204C and 204D belonging to another CDMA system 200. System 200 uses multi-frequency pilot beacons 202A, 202B, 202C and 202D connected to corresponding base stations 206A, 206B, 206C with the exception of beacon 206D which is located away from base station 206D. Beacons 202A, 202B and 202C use antennas 208A, 208B and 208C of corresponding base stations 206A, 206B and 206C for transmitting pilot beacons. Beacon 202D in cell 204D uses its own antenna 210 rather than base station's antenna 208D for transmitting pilot beacons.

Cell 204A uses frequency bands centered at F1, F2 and F3 for CDMA signals. Cell 204B uses frequency bands centered at F1, F2 and F4, cell 204C operates at F1, F2, F3 and F4 while cell 204D only operates at F1. Pilot beacons 202A, 202B, 202C and 202D transmit one or more PN sequences at all four frequencies F1, F2, F3 and F4. Each base station uses different pilot offsets to distinguish them from other nearby base stations. For instance, pilot beacon 202A may transmit $PN_A$ and pilot beacon 202B may transmit $PN_B$ at all frequencies. Thus, a base station control 212 can obtain information whether any given cellular transceiver traveling between cells 204A, 204B, 204C and 204D detects one or more PN sequences at the frequency currently assigned to the user. Based on that information base station control 212 can issue hand-off orders to any desired frequency supported either in the cell in which the transceiver is located or in the cell to which the transceiver is travelling.

Alternatively, for reasons of efficiency or other considerations, beacons 202A, 202B, 202C and 202D need not transmit PN sequences at all the frequencies used in their cells.

Figure 9:
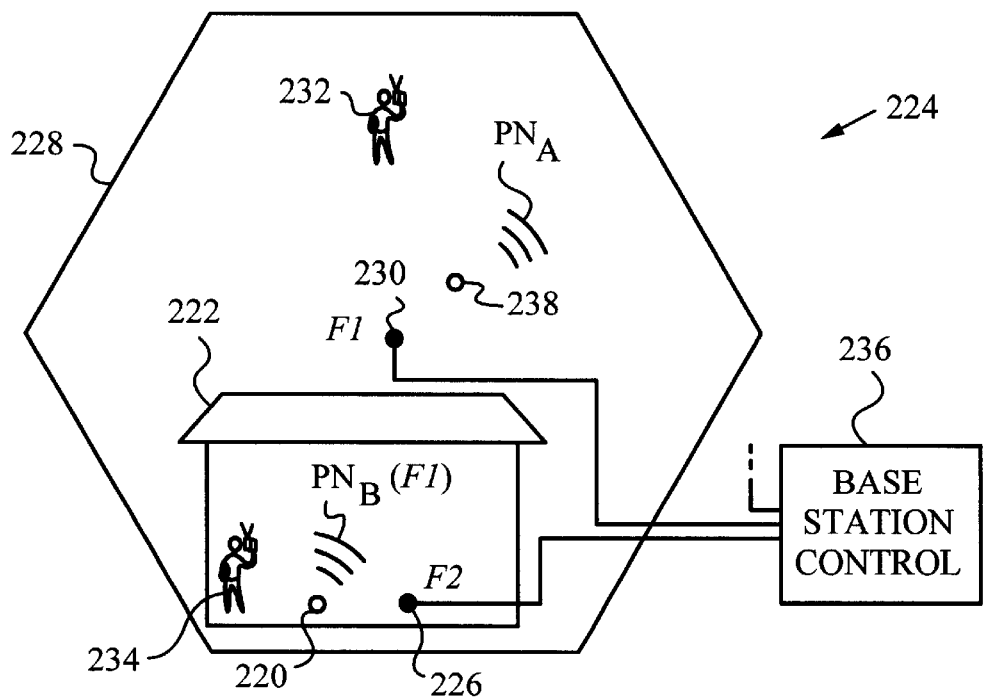
FIG. 9 is a schematic illustrating the use of a multi-frequency pilot beacon in a CDMA network including micro-cells.

FIG. 9. illustrates the application of a multi-frequency pilot beacon 220 in a micro-cell 222 of CDMA system 224. In this case micro-cell 222 covers the inside of a building structure, e.g., an office building. A base station 226 operating at carrier frequency F2 supports communications within building 222. Building 222 is located within a cell 228 with base station 230 which supports communications at carrier frequency F1 and uses a PN offset sequence $PN_A$. Multi-frequency pilot beacon 220 inside building 222 transmits sequence $PN_B$ at frequencies F1 and F2.

While within cell 228, a user of cellular transceiver 232 communicates by CDMA signals at frequency F1 which uses sequence $PN_A$. When entering building 222 a user of cellular transceiver 234, e.g., one authorized to communicate in building 222 via base station 226, will detect sequence $PN_B$ at F1. Thus, when transceiver 234 reports detection of sequence $PN_B$ at F1, base station control 236 will know that the user of transceiver 234 has entered building 222 and is authorized to operate at frequency F2. Hence, base station control 236 sends a hard hand-off order from frequency F1 to frequency F2 with pilot channel $PN_A$ to user 234. The authority of user 234 to communicate within building 222 can be confirmed, e.g., by the identification number of the cellular transceiver of user 234. The hand-off is made possible with the aid of multi-frequency pilot beacon 220.

Of course, other CDMA systems can also benefit from the use of multi-frequency pilot beacons. In fact, the information derived from the presence of additional PN sequences generated by a multi-frequency pilot beacon and transmitted in additional pilot channels can be used by base station control units for many functions besides frequency hand-off. For example, the detection by a transceiver of three separate PN sequences can be converted by the base station control into a binary number and utilized in deriving additional information about the location, power level or other status data about the transceiver.

It will be clear to one skilled in the art that the above embodiment may be altered in many ways without departing from the scope of the invention. Accordingly, the scope of the invention should be determined by the following claims and their legal equivalents.

What is claimed is:

1. A CDMA system with hand-off of a transceiver operating at a first CDMA carrier frequency F1 to either a second CDMA carrier frequency F2 or a third CDMA carrier frequency F3, said CDMA system comprising:
    a) a multi-frequency pilot beacon comprising
        i. a pseudorandom noise generator for supplying a plurality of pseudorandom noise sequences, each of said plurality of sequences $PN_X$ having a unique offset associated with it;
        ii. a frequency conversion means for converting a first number of said plurality of pseudorandom noise sequences to a first pilot beacon centered at said first CDMA carrier frequency F1, a second number of said plurality of pseudorandom noise sequences to a second pilot beacon centered at said second CDMA carrier frequency F2, and a third number of said plurality of pseudorandom noise sequences to a third pilot beacon centered at a third CDMA carrier frequency F3;
        iii. a transmitting means for transmitting said first, second and third pilot beacons to said transceiver;
    a) a CDMA system controller which issues a hand-off decision from said first CDMA carrier frequency F1 to either said second CDMA carrier frequency F2 or said third CDMA carrier frequency F3 based on said pseudorandom noise offsets detected and reported by said transceiver.

2. The CDMA system of claim 1, wherein said first number of said plurality of pseudorandom noise sequences is different from said second number and said third number of said plurality of pseudorandom noise sequences.

3. The CDMA system of claim 1, wherein said first number of said plurality of pseudorandom noise sequences comprises a sequence with a first offset, and said second number of said plurality of pseudorandom noise sequences comprises a sequence with a second offset, and said third number of said plurality of pseudorandom noise sequences comprises a sequence with a third offset wherein said first second and third offsets are different.

4. The CDMA system of claim 1, wherein said first, second and third pilot beacons are transmitted within one cell.

5. The CDMA system of claim 4, wherein said first, second and third pilot beacons are transmitted by a base station.

6. The CDMA system of claim 4, wherein said transmitting means comprises a beacon unit and said first, second and third pilot beacons are transmitted from said beacon unit.

7. The CDMA system of claim 1, wherein said pseudorandom noise sequence $PN_X$ is a digital pseudorandom noise sequence and said multi-frequency pilot beacon further comprises a digital-to-analog converter for converting said digital pseudorandom noise sequence to an analog pseudorandom noise sequence.

8. The CDMA system of claim 7, wherein said pseudorandom noise sequence $PN_X$ is converted to an analog signal at an intermediate frequency.

9. The CDMA system of claim 1, wherein said CDMA controller comprises a means for issuing a hand-off order to said transceiver.

10. A method for handing-off a transceiver operating at a first CDMA carrier frequency F1 to either a second CDMA carrier frequency F2 or a third CDMA carrier frequency F3, said method comprising the following steps:
    a) generating a plurality of pseudorandom noise sequences, each of said plurality of sequences $PN_X$ having a unique offset associated with it;
    b) converting a first number of said pseudorandom noise sequences to a first pilot beacon centered at said first CDMA carrier frequency F1, a second number of said pseudorandom noise sequences to a second pilot beacon centered at said second CDMA carrier frequency F2, and a third number of said pseudorandom noise sequences to a third pilot beacon centered at said third CDMA carrier frequency; and
    c) transmitting said first, second and third pilot beacons to said transceiver; and
    d) using said first, second and third pilot beacons for determining a hand-off decision between said first CDMA carrier frequency F1 and either said second CDMA carrier frequency F2 or said third CDMA carrier frequency F3 based on said pseudorandom noise offsets detected and reported by said transceiver.

11. The method of claim 10, wherein said first number of said plurality of pseudorandom noise sequences is different from said second number and said third number of said plurality of pseudorandom noise sequences.

12. The method of claim 10, wherein said first number of said plurality of pseudorandom noise sequences comprises a sequence with a first offset, and said second number of said plurality of pseudorandom noise sequences comprises a sequence with a second offset, and said third number of said plurality of pseudorandom noise sequences comprises a sequence with a third offset, wherein said first, second and third offsets are different.

13. The method of claim 10, further comprising the step of issuing a hand-off order to said transceiver.

14. The method of claim 13, wherein said hand-off order is determined from a first traffic volume at said first CDMA carrier frequency F1, a second traffic volume at said second CDMA carrier frequency F2, and a third traffic volume at said third CDMA carrier frequency F3.

15. The method of claim 13, wherein said hand-off order is determined from a location of said transceiver.

16. The method of claim 10, wherein said first CDMA carrier frequency F1, said second CDMA carrier frequency F2, and said third CDMA carrier frequency belong to a first base station.

17. The method of claim 10, wherein said first CDMA carrier frequency F1 belongs to a first base station and said second CDMA carrier frequency F2 belongs to a second base station.

18. The method of claim 10, wherein said first, second and third pilot beacons are transmitted independently.

19. The method of claim 10, wherein said first, second and third pilot beacons are transmitted jointly.

20. A CDMA system with hand-off of a transceiver operating at a first CDMA carrier frequency F1 to either a second CDMA carrier frequency F2 or a third CDMA carrier frequency F3, said CDMA system comprising:
   a) a multi-frequency pilot beacon comprising:
      i.) a pseudorandom noise generator for supplying a plurality of pseudorandom noise sequences, each of said plurality of sequences having a unique offset associated with it;
      ii.) a transmitting means for transmitting said plurality of noise sequences to said transceiver;
   a) a CDMA system controller which issues a hand-off decision from said first CDMA carrier frequency F1 to either said second CDMA carrier frequency F2 or said third CDMA carrier frequency F3 based on said pseudorandom noise offsets detected and reported by said transceiver.

21. A method for handing-off a transceiver operating at a first CDMA carrier frequency F1 to either a second CDMA carrier frequency F2 or a third CDMA carrier frequency F3, said method comprising the following steps:
   a) generating a plurality of pseudorandom noise sequences, each of said plurality of sequences having a unique offset associated with it;
   b) transmitting said plurality of pseudorandom noise sequences to said transceiver; and
   c) using said plurality of pseudorandom noise sequences for issuing a hand-off decision between said first CDMA carrier frequency F1 and either said second CDMA carrier frequency F2 or said third CDMA carrier frequency F3 based on said pseudorandom noise offsets detected and reported by said transceiver.

* * * * *